United States Patent [19]

Mailey

[11] Patent Number: 5,333,965
[45] Date of Patent: * Aug. 2, 1994

[54] IN SITU MODULAR FASTENING SYSTEM

[76] Inventor: John W. Mailey, 6114 Fountain Point, Grand Blanc, Mich. 48439

[*] Notice: The portion of the term of this patent subsequent to Mar. 16, 2010 has been disclaimed.

[21] Appl. No.: 939,095

[22] Filed: Sep. 2, 1992

Related U.S. Application Data

[63] Continuation-in-part of Ser. No. 828,724, Jan. 31, 1992, Pat. No. 5,193,933.

[51] Int. Cl.$^5$ .................................. F16D 1/00
[52] U.S. Cl. .................. 403/406.1; 403/408.1; 24/453
[58] Field of Search ............. 403/405.1, 406.1, 407.1, 403/250, 248, 252, 257, 408.1; 24/453, 297

[56] References Cited

U.S. PATENT DOCUMENTS

| | | | |
|---|---|---|---|
| 3,918,130 | 11/1975 | Poe | 24/453 |
| 4,197,029 | 4/1980 | Barreau | 403/407.1 |
| 4,579,478 | 4/1986 | Takahashi | 403/406.1 |
| 4,627,760 | 12/1986 | Yagi | 403/405.1 |
| 4,757,664 | 7/1988 | Freissle | 403/408.1 |
| 4,781,488 | 11/1988 | Hayashi | 403/405.1 |
| 5,193,933 | 3/1993 | Mailey | 403/408.1 |

FOREIGN PATENT DOCUMENTS 0185394  12/1985  European Pat. Off. .

Primary Examiner—P. Austin Bradley
Assistant Examiner—Rex E. Pelto
Attorney, Agent, or Firm—Harness, Dickey & Pierce

[57] ABSTRACT

A modular fastening system which is integrally molded as part of a plastic member which is being fastened to another member is disclosed. The fastening system comprises a locking member and a movable positioning means for selectively permitting the locking member to move between locked and unlocked positions. The position means is connected to the plastic member during the molding process and easily broken away during the assembly process and positioned in the plastic member to complete the fastening process. Because the positioning means is molded as an integral part of the plastic member, no loose fasteners or additional pieces are required.

19 Claims, 3 Drawing Sheets

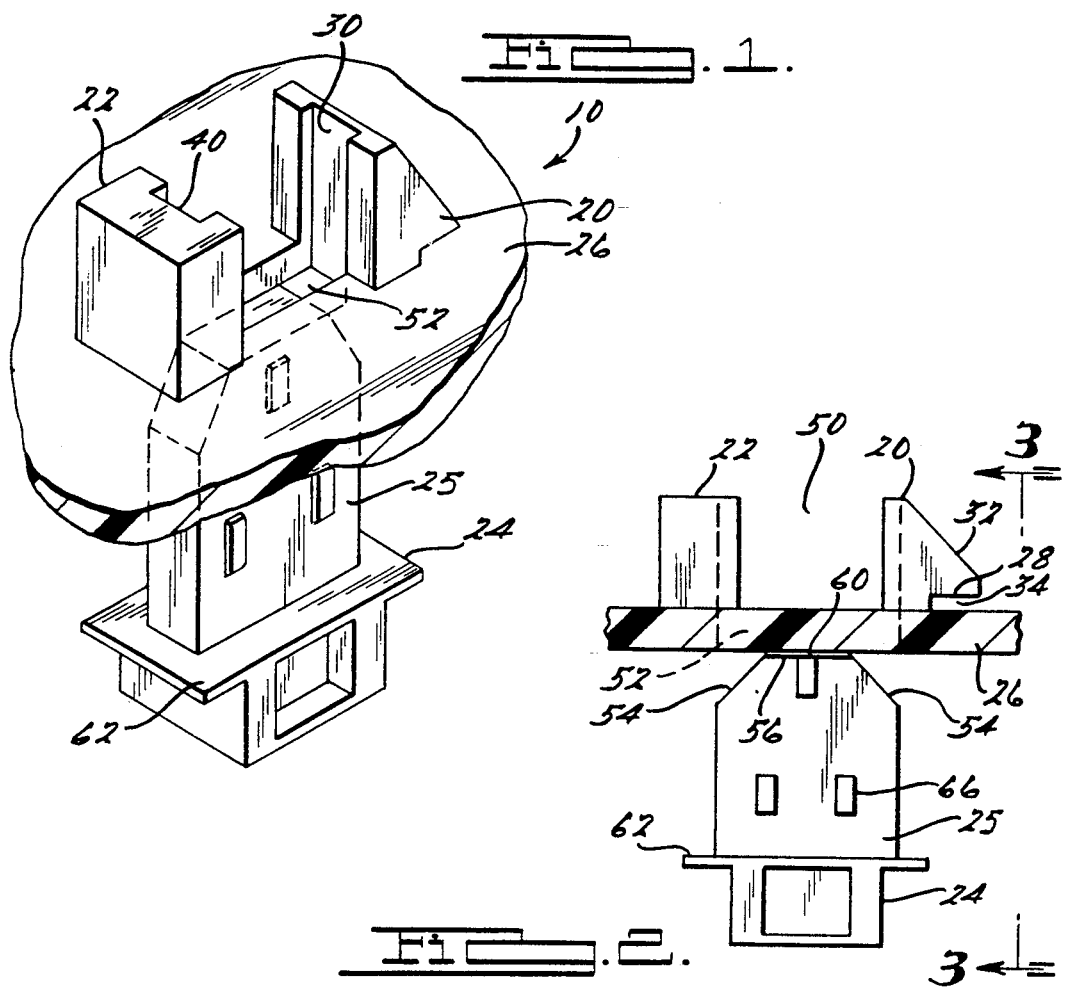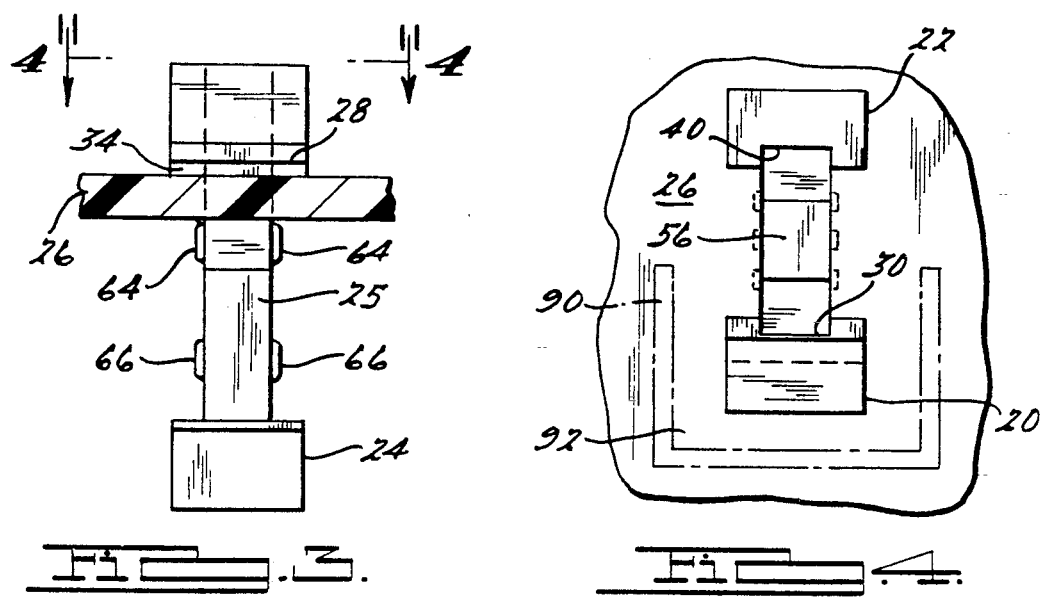

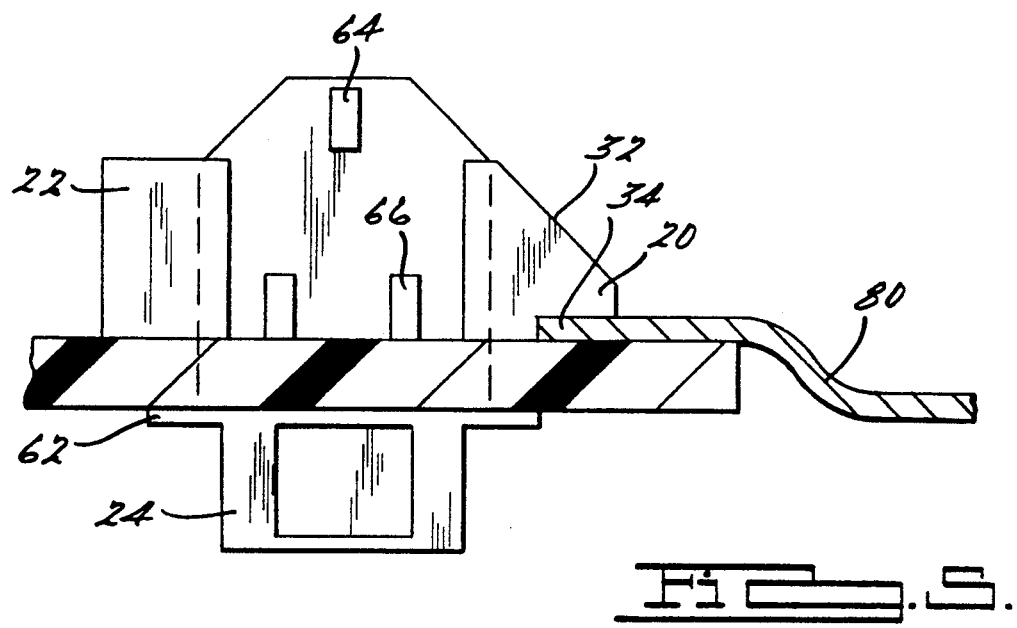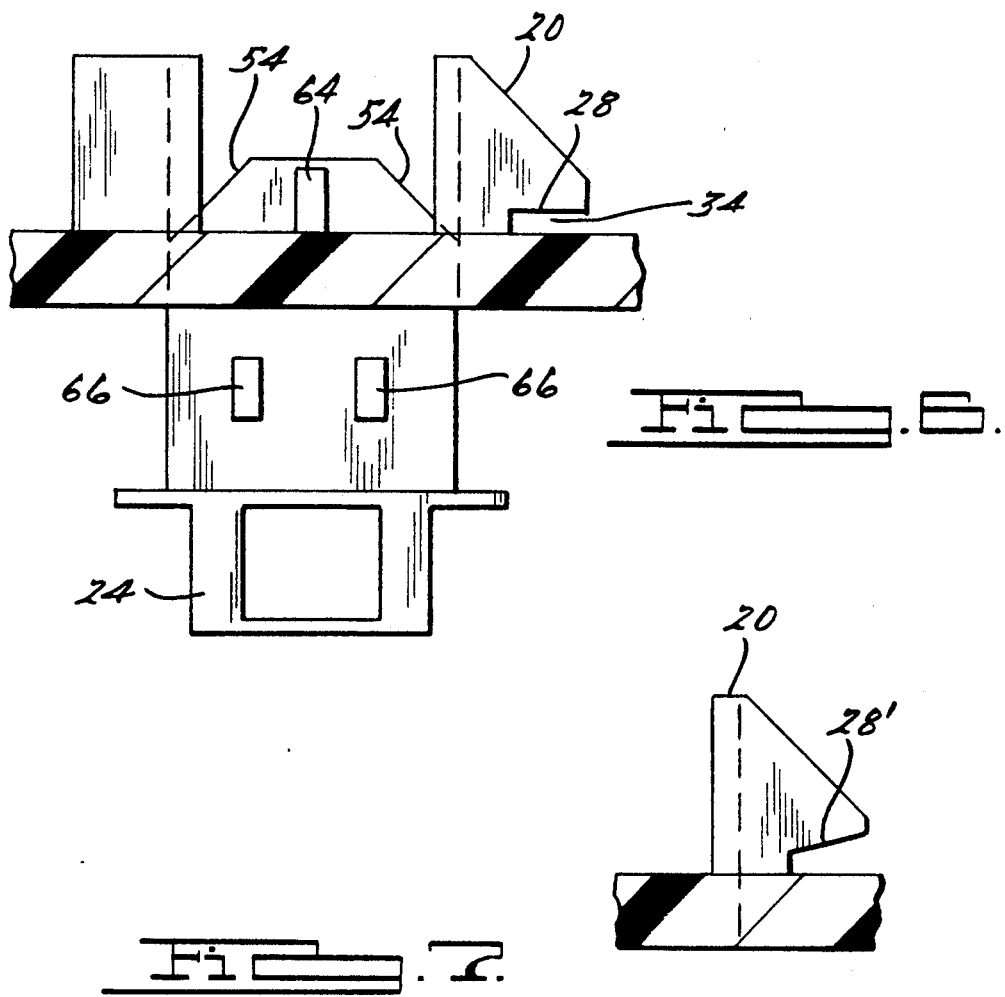

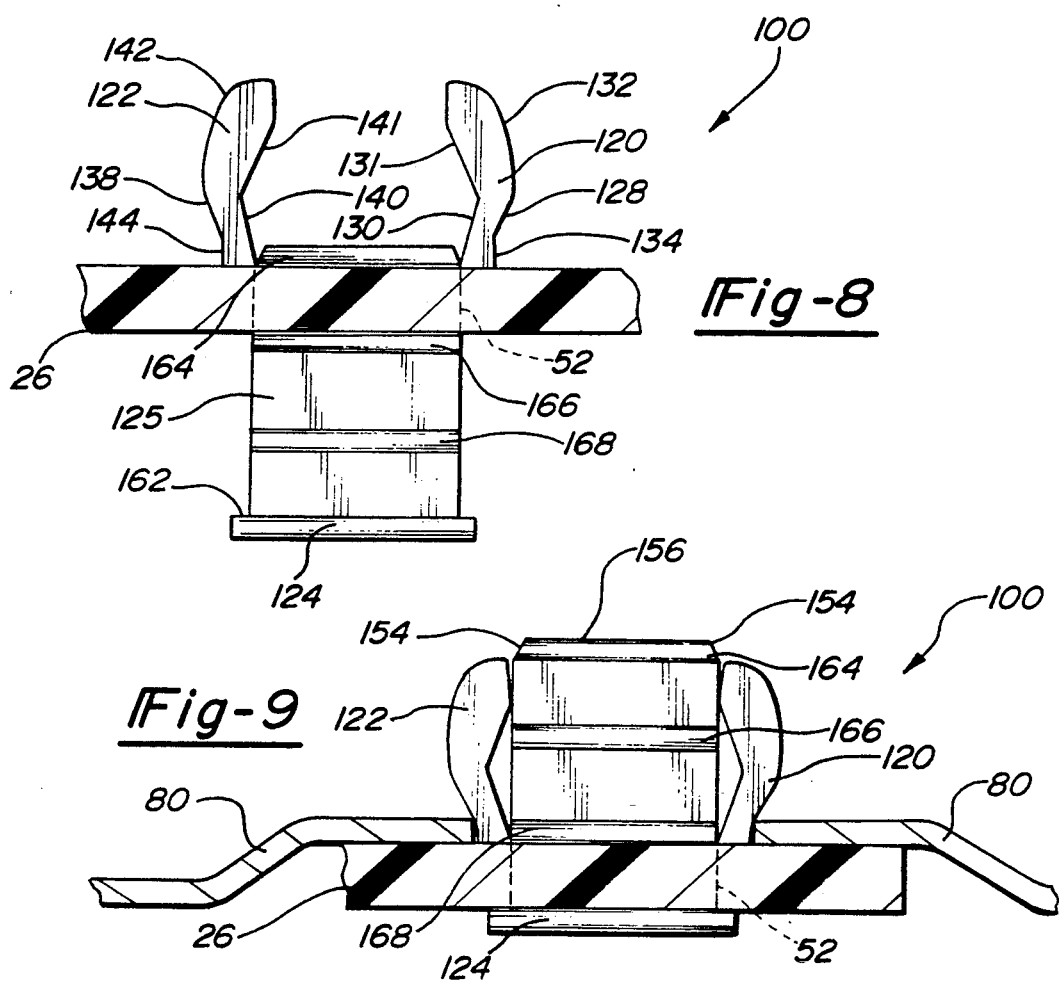
*Fig-8*
*Fig-9*
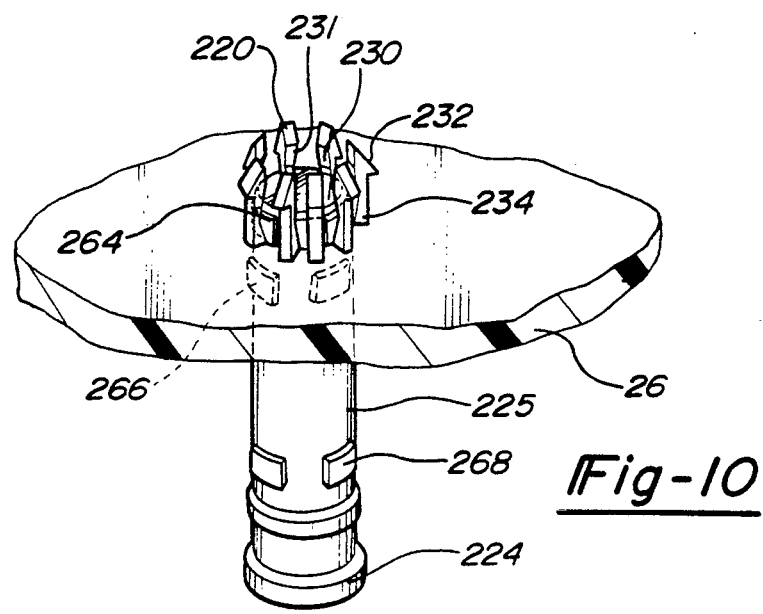
*Fig-10*

IN SITU MODULAR FASTENING SYSTEM

CROSS REFERENCE TO RELATED APPLICATIONS

The present application is a continuation-in-part of U.S. Ser. No. 07/828,724 filed Jan. 31, 1992 now U.S. Pat. No. 5,193,933 entitled "IN SITU MODULAR FASTENING SYSTEM".

BACKGROUND OF THE INVENTION

The present invention relates to fasteners. More particularly, the present invention relates to a two piece plastic fastener with both pieces being integrally molded as a single unit with the part or component being fastened. While the invention relates to the fastening of virtually any plastic component to another, the applicability of the invention to the automotive industry will be highlighted as it is particularly suited for utilization herein.

The automotive industry has in recent times been going through a downsizing and/or weight reducing effort due to several factors including the energy crisis, the cost of materials, government fuel efficiency mandates and the like. A major part of this downsizing and/or weight reduction effort has been to utilize to an ever-increasing extent components made from plastic materials.

Plastic parts are normally fastened to mating components by one or more separate individual fasteners. Industry in general and the automotive industry in particular utilize a wide variety and quantity of fasteners. These fasteners are made from a variety of materials but they have traditionally been made from steel or other metals. The cost of the automotive manufacturer for maintaining an individual active part number for each fastener used is substantial. By having a wide variety of fasteners in varying sizes, each particular fastener represents a separate part number with its attendant individual costs of ordering, tracking, inventory, quality control, service, and the like.

In addition to the cost maintaining part numbers, the quality of the attachment when individual conventional fasteners are used is questionable. Such fasteners are normally affixed and tightened by some type of fastening gun, torque wrench, nut runner, automatic screw driver or other automated tool. These tools are operated either by working on the line or they may be operated by robots. Regardless of how such conventional fasteners are fastened, there is not a reliable means for insuring that the fastening procedure has been properly completed. Therefore, a substantial number of components complete the assembly process having improperly affixed or tightened fasteners.

Accordingly, it would be desirable to provide a fastening system which is light weight, reliable and capable of reducing the number of part numbers that need to be maintained by a manufacturer utilizing the system. The fastening system should also be simple and reliable to assemble to reduce the amount of labor necessary to complete the fastening process and the incidence of misapplied fasteners.

SUMMARY OF THE INVENTION

The present invention is directed to a low cost, light weight, reliable fastening system in which the fastener is integrally molded at same time and of the same material as the plastic component it attaches. The fastener of the present invention is part of the plastic component itself. It thereby eliminates the need to match and apply particular conventional fasteners with particular components. The fastening system utilizes a living hinge that is selectively rendered inoperable by the assembler after the plastic component is fastened.

From the subsequent detailed description, appended claims and drawings, other objects and advantages of the present invention will become apparent to those skilled in the art.

DESCRIPTION OF THE DRAWINGS

FIG. 1 is a perspective view partially in cross section of a preferred embodiment of the in situ modular fastening system of the present invention prior to completion of the fastening step.

FIG. 2 is a side view of the modular fastening system of FIG. 1.

FIG. 3 is a side view of the modular fastening system taken in direction 3—3 of FIG.

FIG. 4 is a view of the modular fastening system taken in direction 4—4 of FIG. 3.

FIG. 5 is a side view of the modular fastening system of FIG. 2 after the fastening process has been completed.

FIG. 6 is a side view of the modular fastening system of the present invention with the fastener in the open position.

FIG. 7 is a side view of another embodiment of the locking member of the modular fastening system of the present invention.

FIG. 8 is a side view of the modular fastening system in accordance with another embodiment of the present invention with the fastener in the open position.

FIG. 9 is a side view of the modular fastening system shown in FIG. 8 with the fastener in the locked position.

FIG. 10 is a perspective view of the modular fastening system in accordance with another embodiment of the present invention.

DESCRIPTION OF THE INVENTION

The modular fastening system of the present invention is designated by reference numeral 10 and shown in FIGS. 1-4. Modular fastening system 10 comprises three members, a locking member 20, a support guide 22, and an anvil 24. All three of these members are manufactured as an integral part of plastic part or component 26. Preferably, component or part 26 is a plastic injection molded piece having integral locking member 20, support guide 22 and anvil 24 simultaneously molded therewith. While modular fastening system 10 can be molded from virtually any injection moldable plastic, polypropylene acetal has been found to be a particularly suitable plastic.

In the preferred embodiment, locking member 20 extends generally perpendicular to part 26. Locking member 20 defines a first guiding channel 30 which also extends generally perpendicular to part 26. A camming surface 32 is located on locking member 20 opposite the first guiding channel 30. Locking member 20 further defines a retention slot 34 located between surface 28 of locking member 20 and part 26. The portion of locking member 20 between slot 34 and first guiding channel 30 is dimensionally configured to provide a living hinge between locking member 20 and part 26. Locking member 20 is thereby permitted to flex or deflect relative to the surface of part 26 when a lateral force is applied against camming surface 32. The function of first guide channel 30, camming surface 32 and slot 34 will be further described herein.

Support guide 22 extends generally perpendicular to part 26 and generally parallel to and spaced apart from locking member 20 as shown in FIG. 2. Support guide 22 defines a second guiding channel 40 which is generally parallel to first guiding channel 30. As discussed, locking member 20 and support guide 22 are separated from each other by a predetermined distance. First guiding channel 30 and second guiding channel 40 are opposite each other and form a guiding slot 50. Part 26 has an aperture 52 which is located between first and second guiding channels 30 and 40 and forms an opening which allows access to guiding slot 50 as shown in FIGS. 1 and 2.

Anvil 24 also extends generally perpendicular to part 26 and is located during the injection molding process on the side of part 26 opposite locking member 20 and support guide 22. Anvil 24 comprises a plunger portion 25 that has a cross section which is substantially similar but slightly smaller than aperture 52 in part 26. One end of plunger portion 25 has a pair of angled surfaces 54 and a flat surface 56. Upon completion of the injection molding process, anvil 24 is generally aligned with aperture 52 and attached to part 26 by a breakaway 60 along flat surface 56. Breakaway 60 is an amount of plastic formed during injection molding between anvil 24 and part 26 that is designed to be strong enough to maintain the position of anvil 24 during normal handling and shipping, but weak enough to be broken when completion of the assembly process is desired as will be explained later herein. A travel stop or shoulder 62 is located on anvil 24 opposite angled surface 54 of plunger portion 25. Anvil 24 also has two sets of retaining tabs 64 and 66. Upper tabs 64, one located on each side of anvil 24, are used to maintain the positioning of anvil 24 within opening 52 during assembly or disassembly of part 26. Lower tabs 66, two tabs located on each side of anvil 24 closer to shoulder 62, are used to maintain the positioning of anvil 24 within aperture 52 and guiding slot 50 after assembly has been completed.

The operation of modular fastening system 10 is as follows. Part 26 is provided with locking member 20, support guide 22 and anvil 24 formed as part of the plastic piece as shown in FIG. 2. Component 80 is the component to which part 26 is to be attached, in this particular instance sheet metal having a thickness of approximately 3 millimeters is shown in FIG. 5. Part 26 is attached to component 80 by moving part 26 towards component 80 in a direction that is generally perpendicular to component 80. As part 26 approaches component 80, camming surface 32 of locking member 20 is forced against component 80. As part 26 is moved further towards component 80 a load is applied by the edge of component 80 to camming surface 32. This load against camming surface 32 causes locking member 20 to deflect at the living hinge towards support guide 22 thereby opening slot 34 to accept the edge of component 80.

Under certain circumstances it may be desired to reduce the amount of load required to deflect locking member 20 in order to accept component 80. In this case, a U-shaped channel 90 as shown in phantom in FIG. 4 may be molded in part 26. Channel 90 extends completely through part 26 and forms a tab member 92. When load against the camming surface 32 is exerted, both locking member 20 and tab member 92 deflect to open slot 34 for accommodating component 80. Once the edge of component 80 to which part 26 is being attached is seated in slot 34, locking member 20 returns to its generally perpendicular position.

Either prior to or during the assembly process, anvil 24 is broken away from part 26 by shearing breakaway 60. The shearing of breakaway 60 can be accomplished by a twisting or bending of anvil 24 relative to part 26 or by exerting a load against anvil 24 perpendicular to part 26 to move anvil 24 into opening 52. Once breakaway 60 has been sheared, anvil 24 is inserted through aperture 52 and into guiding slot 50. If assembly of part 26 with component 80 has already taken place, the insertion of anvil 24 through aperture 52 and into guiding slot 50 is continued until travel stop 62 is seated against part 26 as shown in FIG. 5. Retaining tabs 66 maintain anvil 24 in this position. If assembly of part 26 with component 80 has not yet taken place, the insertion of anvil 24 through aperture 52 and into guiding slot 50 is continued only until anvil 24 is oriented with respect to aperture 52 such that retaining tabs 64 are on one side of aperture 52 and retaining tabs 66 are on the other side. In this manner, locking member 20 is not prevented by anvil 24 from deflecting at the living hinge to accept the edge of component 80.

When in its fully inserted position, wherein travel stop 62 is seated against the surface of part 26, anvil 24 restricts the deflecting movement of locking members 20. The edge of component 80 is secured in slot 34 and the fastening operation is complete. As shown in FIG. 5, the lower tabs 66 are now located above part 26 to aid in ensuring that anvil 24 remains in a locked position.

When disassembly of part 26 and component 80 is desired, anvil 24 is moved to the open position as shown in FIG. 6. Lower retaining tabs 66 are forced through aperture 52 until upper retaining tabs 66 are on one side of part 26 and lower retaining tabs 64 are on the other side in order to retain anvil 24 in aperture 52. Angled surface 54 of anvil 24 provides the necessary clearance for the locking member 20 to again deflect towards guiding post 22 and release the edge of component 80. As an alternative embodiment, surface 28 of the locking post 20 can be provided with an angular surface 28' as shown in FIG. 7 to aid in disassembly if desired. Reassembly of part 26 and component 80 is again possible by simply uniting the two components as previously described and moving anvil 24 back into the locked position.

It is to be appreciated that while anvil 24, aperture 52, guide slots 50 and guide channels 30 and 40 are shown with generally rectangular cross-sections, other cross-sectional shapes and component configurations such as circular, square, triangular and the like may also be utilized. Also, it is to be appreciated that while locking member 20 and support guide 22 are shown to be generally perpendicular to part 26, other angular relationships between the locking member 20 and support guide 22, and part 26 may also be utilized.

Referring now to FIGS. 8 and 9, another embodiment of the modular fastening system of the present invention is shown and is designated by the reference numeral 100. Modular fastening system 100 comprises three members, a first locking member 120, a second locking member 122 and an anvil 124. All three of these members are manufactured as an integral part of the plastic part or component 26. Preferably, the component or part 26 is a plastic injection molded piece having first integral locking member 120, second integral locking member 122 and anvil 124 simultaneously molded therewith. While modular fastening system 100 can be molded from virtually any injection moldable plastic, polypropylene acetal has been found to be a particularly suitable plastic.

In the embodiment shown in FIGS. 8 and 9, first locking member 120 extends generally perpendicular to part 26. First locking member 120 defines an interior surface 130 which also extends generally perpendicular to part 26. A first camming surface 131 is located on the upper portion of interior surface 130 as shown in FIGS. 8 and 9. A second camming surface 132 is located on first locking member 120 on the side of first locking member 120 opposite interior surface 130. First locking member 120 further defines a retention slot 134 located between a surface 128 of first locking member 120 and part 26. The portion of first locking member 120 between slot 134 and interior surface 130 is dimensionally configured to provide a living hinge between first locking member 120 and part 26. First locking member 120 is thereby permitted to flex or deflect relative to the surface of part 26 when a lateral force is applied against either first camming surface 131 or second camming surface 132. The function of first camming surface 131, second camming surface 132 and slot 134 will be further described herein.

Second locking member 122 extends generally perpendicular to part 26 and generally parallel to and spaced apart from locking member 120 as shown in FIGS. 8 and 9. Second locking member 122 is symmetrically identical to first locking member 120. Second locking member 122 defines an interior surface 140 which also extends generally perpendicular to part 26. A first camming surface 141 is located on the upper portion of interior surface 140 as shown in FIGS. 8 and 9. A second camming surface 142 is located on second locking member 122 on the side of second locking member 122 opposite interior surface 140. Second locking member 122 further defines a retention slot 144 located between a surface 138 of second locking member 122 and part 26. The portion of second locking member 122 between slot 144 and interior surface 140 is dimensionally configured to provide a living hinge between second locking member 122 and part 26. Second locking member 122 is thereby permitted to flex or deflect relative to the surface of part 26 when a lateral force is applied against either first camming surface 141 or second camming surface 142. The function of first camming surface 141, second camming surface 142 and slot 144 will be further described herein.

Anvil 124 also extends generally perpendicular to part 26 and is located during the injection molding process on the side of part 26 opposite first and second locking members 120 and 122. Anvil 124 comprises a plunger portion 125 that has a cross section which is substantially similar but slightly smaller than the aperture 52 in part 26. One end of plunger portion 125 has a pair of angled surfaces 154 and a flat surface 156. Upon completion of the injection molding process, anvil 124 is generally aligned with aperture 52 and attached to part 26 by a breakaway similar to the embodiment shown and described in FIGS. 1–7 above. A travel stop or shoulder 162 is located on anvil 124 opposite angled surfaces 154 of plunger portion 125. Anvil 124 also has three sets of retaining tabs 164, 166 and 168. Tabs 164 and 166, each having one tab located on opposite sides of anvil 24, are used to maintain the positioning of anvil 24 within aperture 52 during assembly or disassembly of part 26 as shown in FIG. 8. Tabs 168, one located on opposite sides of anvil 24, in conjunction with shoulder 162 are used to maintain the positioning of anvil 24 within aperture 52 after assembly has been completed as shown in FIG. 9.

The operation of modular fastening system 100 is similar to that described above for system 10. Part 26 is provided with first locking member 120, second locking member 122 and anvil 124 formed as part of the plastic piece as shown in FIGS. 8 and 9. Component 80 is the component to which part 26 is to be attached, in this particular instance sheet metal having a thickness of approximately 3 millimeters is shown in FIG. 9. Part 26 is attached to component 80 by moving part 26 towards component 80 in a direction that is generally perpendicular to component 80. As part 26 approaches component 80, second camming surfaces 132 and 142 of first and second locking members 120 and 122, respectively, are forced against component 80. As part 26 is moved farther towards component 80, a load is applied by the edges of component 80 to second camming surface 132 and 142. This load against second camming surfaces 132 and 142 causes first and second locking members 120 and 122 respectively to deflect at their living hinge connection to part 26 towards each other thereby enabling slots 134 and 144 to accept the edges of component 80. The amount of load necessary to deflect first and second locking members 120 and 122 can be controlled by the depth of slots 134 and 144 respectively, the thickness of the living hinge and the width of locking members 120 and 122.

Either prior to or during the assembly process, anvil 124 is broken away from part 26 by shearing the breakaway similar to that described above for the embodiment shown in FIGS. 1–7. Once anvil 124 is separated, it is inserted through aperture 52 in between first and second locking members 120 and 122. If assembly of part 26 with component 80 has already taken place, the insertion of anvil 124 through aperture 52 is continued until travel stop 162 is seated against part 26 as shown in FIG. 9. During the insertion of anvil 124, first and second locking members 120 and 122 are forced outward by the camming effect of contact between anvil 124 and first camming surfaces 131 and 141. Tabs 168 in conjunction with travel stop 162 maintain anvil 124 in the fully inserted position. If assembly of part 26 with component 80 has not yet taken place, the insertion of anvil 124 through aperture 52 is continued only until anvil 124 is positioned such that tabs 164 are on one side of aperture 52 and tabs 166 are on the opposite side as shown in FIG. 8. In this manner, first and second locking members 120 and 122 are not prevented by anvil 124 from deflecting inwardly to accept the edges of component 80.

When in its fully inserted position, wherein travel stop 162 is seated against the surface of part 26, anvil 124 restricts the deflecting of first and second locking members 120 and 122. The edges of component 80 are secured in slots 134 and 144 and the fastening operation is complete. As shown in FIG. 9, tabs 168 are located above part 26 to aid in ensuring that anvil 124 remains in a locked position.

When disassembly of part 26 and component 80 is desired, anvil 24 is moved to the open position shown in FIG. 8. Tabs 168 and tabs 166 are forced through aperture 52. Thus, tabs 166 are on one side of part 26 and tabs 164 are on the opposite side in order to retain anvil 124 in aperture 52. Angled surfaces 154 of anvil 124 provide the necessary clearances for first and second locking members 120 and 122 to again deflect toward each other and release component 80. Surfaces 128 and 138 can be configured at an angle as shown in FIGS. 8 and 9 to aid in disassembly if desired. Reassembly of part 26 and component 80 is again possible by simply uniting the two components as previously described and moving anvil 24 back into the locked position.

It is to be appreciated that while anvil 124 and aperture 52 are shown with generally rectangular cross-sections, other cross-sectional shapes and component configurations such as circular, square, triangular and the like may also be utilized. Also, it is to be appreciated that while first and second locking members 120 and 122 are shown to be generally perpendicular to part 26, other angular relationships between first and second locking members 120 and 122 and part 26 may also be utilized.

FIG. 10 shows still another embodiment of the modular fastening system of the present invention and is designated by reference numeral 200. Modular fastening system 200 comprises a cylindrical anvil 224 and a plurality of locking members 220. The operation of this embodiment is substantially identical to that described above for the embodiment shown in FIGS. 8 and 9. Each locking member 220 of the plurality of locking members has an interior surface 230 with a first camming surface 231, a second camming surface 232, and a retention slot 234.

Anvil 224 has a plunger portion 225 and three sets of retaining tabs 264, 266 and 268. Anvil 224 is also molded during the injection molding process in general alignment with aperture 52 and attached to part 26 by a breakaway similar to the embodiment shown and described in FIGS. 1–7 above. The operation of attachment and function of the various elements of this embodiment is identical to that described for the embodiment shown and described above for FIGS. 8 and 9.

While the above detailed description describes the preferred embodiment of the present invention, it should be understood that the present invention is susceptible to modification, variation and alteration without deviating from the scope and fair meaning of the subjoined claims.

What is claimed is:

1. An integral modular fastening system for connecting a plastic member to a frame, said fastening system comprising:
 a plurality of locking members homogenous with and extending generally perpendicular from said plastic member and forming a slot for engaging said frame between at least one of said plurality of locking members and said plastic member, each of said plurality of locking members being movable between a locked position and an unlocked position;
 an anvil movable between an open and closed position, said anvil disposed adjacent to said plurality of locking members in both said open and said closed positions, said anvil positioning said plurality of locking members in said locked position when in said closed position and prohibiting said plurality of locking members from moving from said locked position towards said unlocked position, said anvil allowing said plurality of locking members to move from said locked position towards said unlocked position when in said open position;
 means for retaining said anvil in said closed position homogenous with said anvil;
 means for retaining said anvil in said open position homogenous with said anvil.

2. The fastening system of claim 1 further comprising means for urging said plurality of locking members towards said locked position.

3. The fastening system of claim 1 wherein said anvil is molded as an integral part of said plastic member.

4. The fastening system of claim 1 wherein said plastic member has an aperture located adjacent to said plurality of locking members, said anvil being disposed in said aperture.

5. The fastening system of claim 4 wherein said anvil is disposed in line with said aperture in said plastic member and attached to said plastic member by a breakaway means.

6. The fastening system of claim 1 wherein said anvil is rectangular in shape and said plurality of locking members equal two locking members.

7. The fastening system of claim 1 wherein said means for retaining said anvil in said closed position comprises:
 at least one rib extending from said anvil; and
 a shoulder disposed at one end of said anvil.

8. The fastening system of claim 1 wherein said means for retaining said anvil in said open position comprises:
 at least one first rib extending from said anvil; and
 at least one second rib spaced apart from said first rib, said second rib extending from said anvil.

9. The fastening system of claim 1 wherein said anvil is cylindrical.

10. The fastening system of claim 1 wherein said plurality of locking members are disposed in a circular array.

11. An integral modular fastening system for connecting a plastic member to a frame, said fastening system comprising:
 a plurality of locking members homogenous with and extending generally perpendicular from said plastic member and forming a slot for engaging said frame between at least one of said plurality of locking members and said plastic member, each of said plurality of locking members being movable between a locked position and an unlocked position;
 an anvil disposed adjacent to said plurality of locking members and movable between an open and closed position, said anvil positioning said plurality of locking members in said locked position when in said closed position and prohibiting said plurality of locking members from moving from said locked position towards said unlocked position, said anvil allowing said plurality of locking members to move from said locked position towards said unlocked position when in said open position;
 means for retaining said anvil in said closed position homogenous with said anvil;
 means for retaining said anvil in said open position homogenous with said anvil, said means for retaining said anvil in said open position comprising at least one first rib extending from said anvil and at least one second rib spaced apart from said first rib, said second rib extending from said anvil.

12. The fastening system of claim 11 further comprising means for urging said plurality of locking members towards said locked position.

13. The fastening system of claim 11 wherein said anvil is molded as an integral part of said plastic member.

14. The fastening system of claim 11 wherein said plastic member has an aperture located adjacent to said plurality of locking members, said anvil being disposed in said aperture.

15. The fastening system of claim 14 wherein said anvil is disposed in line with said aperture in said plastic member and attached to said plastic member by a breakaway means.

16. The fastening system of claim 11 wherein said anvil is rectangular in shape and said plurality of locking members equal two locking members.

17. The fastening system of claim 11 wherein said means for retaining said anvil in said closed position comprises:

at least one rib extending from said anvil; and a shoulder disposed at one end of said anvil.

18. The fastening system of claim 11 wherein said anvil is cylindrical.

19. The fastening system of claim 11 wherein said plurality of locking members are disposed in a circular array.

* * * * *